US006922815B2

(12) United States Patent
Rosen

(10) Patent No.: US 6,922,815 B2
(45) Date of Patent: Jul. 26, 2005

(54) DISPLAY METHOD AND APPARATUS FOR FACILITATING INTERACTION WITH WEB SITES

(75) Inventor: Mike Rosen, West Chester, PA (US)

(73) Assignee: James A. Nolen, III, King of Prussia, PA (US)

(*) Notice: Subject to any disclaimer, the term of this patent is extended or adjusted under 35 U.S.C. 154(b) by 513 days.

(21) Appl. No.: 09/851,466

(22) Filed: May 8, 2001

(65) Prior Publication Data

US 2002/0135538 A1 Sep. 26, 2002

Related U.S. Application Data

(60) Provisional application No. 60/252,203, filed on Nov. 21, 2000.

(51) Int. Cl.[7] ................................................ G09G 5/00
(52) U.S. Cl. ...................... 715/782; 715/738; 715/802; 715/850; 705/26
(58) Field of Search ................................. 715/781–782, 715/759, 776, 738–739, 802–804, 848–852; 705/26–27; 345/759, 776, 738, 739, 781, 782, 802, 803, 804, 848–852, 381, 382

(56) References Cited

U.S. PATENT DOCUMENTS

| | | | | |
|---|---|---|---|---|
| 5,670,984 A | * | 9/1997 | Robertson et al. | 345/585 |
| 5,678,015 A | * | 10/1997 | Goh | 345/782 |
| 5,809,250 A | | 9/1998 | Kisor | 395/200.57 |
| 5,880,733 A | * | 3/1999 | Horvitz et al. | 345/850 |
| 6,043,818 A | * | 3/2000 | Nakano et al. | 345/851 |
| 6,182,072 B1 | | 1/2001 | Leak et al. | 707/10 |
| 6,188,405 B1 | * | 2/2001 | Czerwinski et al. | 345/764 |
| 6,297,824 B1 | * | 10/2001 | Hearst et al. | 345/848 |
| 6,313,855 B1 | * | 11/2001 | Shuping et al. | 345/854 |
| 6,345,273 B1 | | 2/2002 | Cochran | 707/4 |
| 6,459,435 B1 | * | 10/2002 | Eichel | 345/588 |
| 6,486,895 B1 | * | 11/2002 | Robertson et al. | 345/776 |
| 6,577,330 B1 | * | 6/2003 | Tsuda et al. | 345/782 |

* cited by examiner

*Primary Examiner*—John W. Cabeca
*Assistant Examiner*—Cuong T. Thai
(74) *Attorney, Agent, or Firm*—Synnestvedt & Lechner LLP

(57) ABSTRACT

The invention is a computer-implemented method and apparatus for organizing Web pages and other computer files relative to each other in a manner analogous to a three or four dimensional spatial relationship and displaying multiple Web pages simultaneously in multiple panels of a computer monitor in accordance with said spatial organization, whereby despite the organization, at least one of the Web pages or files can be made to stay in the same panel of the display while the user navigates through the virtual multidimensional space.

26 Claims, 5 Drawing Sheets

DISPLAY METHOD AND APPARATUS FOR FACILITATING INTERACTION WITH WEB SITES

RELATED APPLICATION

This application claims priority and herein incorporates by reference U.S. provisional patent application No. 60/252,203 filed Nov. 21, 2000.

Field of the Invention

The invention pertains to computer interfaces. More particularly, the invention pertains to Web browsers that allow a user to view multiple Web pages simultaneously.

BACKGROUND OF THE INVENTION

By now, most people are familiar with the Internet and the World Wide Web (Web). The Internet is a collection of interconnected communication networks that together span the globe. Information content on the Internet is presented via pages, each page comprising one or more files that are stored on a computer server that is coupled to the Internet. Each essentially an address on the Internet identifying the server and the particular file on that server that comprises that page. These pages are accessible to anyone with access to a computer coupled to the Internet and who knows (or at least can determine, for instance, via a search engine) the URL of the particular page of interest. Most pages on the Web are, not only directly accessible, but also accessible via hyperlinking from other pages on the Internet in accordance with a protocol termed hypertext transfer protocol (HTTP). Hypertext Markup Language (HTML) is a computer language generally used to describe how pages are organized, formatted, and linked together via the Internet. Other languages are known and are being developed also.

In HTTP, pages on the Web may be interconnected via hyperlinks. A hyperlink is a portion of one page, e.g., text or an image, that automatically addresses another page on the Web. By manipulating one's mouse to cause the screen pointer to move over the hyperlink and clicking the left mouse button, the page associated with that hyperlink is accessed via the Internet and is made to replace the previous page on one's computer screen.

Web browsers are computer programs using HTTP and HTML that enable one to access and view Web pages via direct addressing (typing the address of a Web page in an address field) and/or by hyperlinking as described above. Netscape Navigator™ and Microsoft Internet Explorer™ are the two most common Web browser software packages in use today. These Web browsers generally load and display a single page on the computer screen at any given time. When a Web browser links to that page, the browser software loads and displays that page, replacing any page that may have previously been displayed.

U.S. patent application Ser. No. 09/561,862 entitled "Method and Apparatus for Three Dimensional Internet and Computer File Interface", assigned to the same assignee as the present application and which is incorporated by reference herein, discloses a web browser that provides an interface to the Web that displays multiple Web pages simultaneously in a display mode that emulates three or four dimensional space. The browser provides its user a Web surfing experience that emulates moving or navigating through a three or four dimensional space. While the method and apparatus disclosed in the aforementioned patent application is particularly adapted for use in connection with browsing the Internet, it can also readily be applied to interfacing with computer programs on which a user might wish to open and view multiple windows simultaneously.

In accordance with the aforementioned U.S. patent application Ser. No. 09/561,862, a plurality of related Web pages are organized and presented for view on a computer screen in an apparent three or four dimensional relationship to each other, as illustrated in FIG. 1. In one embodiment, five Web pages, labeled 1, 2, 3, 4, and 5, respectively, are displayed comprising center, top, bottom left, and right panels forming five inside faces of a cube. The sixth and last face of the cube can be considered to correspond to the view screen of the monitor (or alternately might be considered to be behind the user) and is not filled with a page. Accordingly, the operator of the computer has the impression that he is looking into the inside of a cube from one end of the cube.

Other Web browsers are known which allow the simultaneous display of multiple Web pages in other arrangements, e.g., a standard, two-dimensional, tile arrangement.

One of the common uses of the World Wide Web is shopping. That is, many retailers maintain Web sites comprising many pages on which goods that they offer for sale are displayed and described. The pages that comprise the retail Web site are hyperlinked to each other in a manner which facilitates locating a particular good that a Web surfing shopper might wish to purchase through the retail Web site. Retail Web sites also frequently include a page, commonly called a checkout or shopping cart page, used to commit to an actual purchase of goods from the retailer. In a typical checkout page, the user must enter various information such as name, address, shipping address, goods desired to purchase, and credit card number. Many Web sites include as part of the checkout page a virtual shopping cart. As the shopper selects goods for purchase, they are added to the shopper's virtual shopping cart on the checkout page.

In many Web sites, the goods desired for purchase are automatically entered into the shopping cart without displaying the checkout page once the shopper indicates (in the page on which the goods are displayed) an intent to purchase it. For instance, when a user locates a good that he or she wishes to purchase in one of the other pages comprising the Web site, the user might be able to automatically add the good to the shopping cart in the checkout page by double clicking on an appropriate display element in the page on which the good is displayed and/or described.

In order to determine what goods the shopper has added to the shopping cart, the shopper must call up and display the checkout page to view the list of items in the shopping cart. Shoppers frequently must check the checkout page during a shopping visit to a Web site because they cannot remember what items they have added to their shopping carts or the need to know other information about their purchases. For instance, even when a shopper can recall what items have been added to the shopping cart, shoppers often feel compelled to check the checkout page to make sure that the intended items were actually added to the shopping cart and/or to check the running cost total of the items in their shopping carts. Also, just as in a real shopping environment, virtual shoppers often place an item in their shopping carts and then decide that they do not want that item. Often the shopper finds a more desirable item of the same type later in the shopping session and wishes to replace the previous item with the later found item. Another common circumstance is when the shopper discovers the total cost of the selected items and must delete one or more in order to stay within his or her budget. Even further, shoppers simply may change their minds before making a final purchase decision. Each of these circumstances requires another visit to the checkout page in order to take the desired action.

Accordingly, it is an object of the present invention to provide an improved Web browser that facilitates virtual shopping.

It is another object of the present invention to provide a Web browser that allows a user to view multiple Web pages simultaneously.

It is a further object of the present invention to provide a Web browser that allows a user to view multiple Web pages simultaneously to navigate through a Web site while maintaining a certain Web page in a certain panel of the display.

SUMMARY OF THE INVENTION

The invention is a computer-implemented method and apparatus for simultaneously displaying multiple Web pages in multiple panels of a computer monitor, the multiple pages arranged to simulate a three or four dimensional space comprised of said pages. In general, as a user navigates through the virtual space by selectively moving pages from panel to panel in the display. The pages in all of the panels of the display change correspondingly to preserve the illusion of navigating through space. However, in order to facilitate certain types of Web surfing experiences, such as shopping, one Web page can be forced to stay in the same panel of the display while the user navigates through the virtual space while the pages in the other panels continue to change places so that they remain in the same virtual spatial relation to each other. For instance, when a user is shopping, it may be particularly desirable for the check out page or shopping cart page to always be displayed in a particular panel as the user navigates through the other pages of the Web site. In accordance with the invention, a user may pull up such a page and designate it as an "always there" page, in which case the browser will keep that page in the same panel until the "always there" feature is disabled for that panel.

DETAILED DESCRIPTION OF THE INVENTION

In the terminology used in the present specification, the portions of the computer screen within which separate and/or independent information content may be displayed is termed a panel. Thus, a page or file is the information content displayable in a panel. In connection with aforementioned U.S. patent application Ser. No. 09/561,862, the display format of which is used for exemplary purposes in this specification and in which panels are organized to appear as the surfaces of a three dimensional cube or a four dimensional hypercube, the term "face" refers to a surface of cube or hypercube. Accordingly, each panel corresponds to a face.

Figure 1:
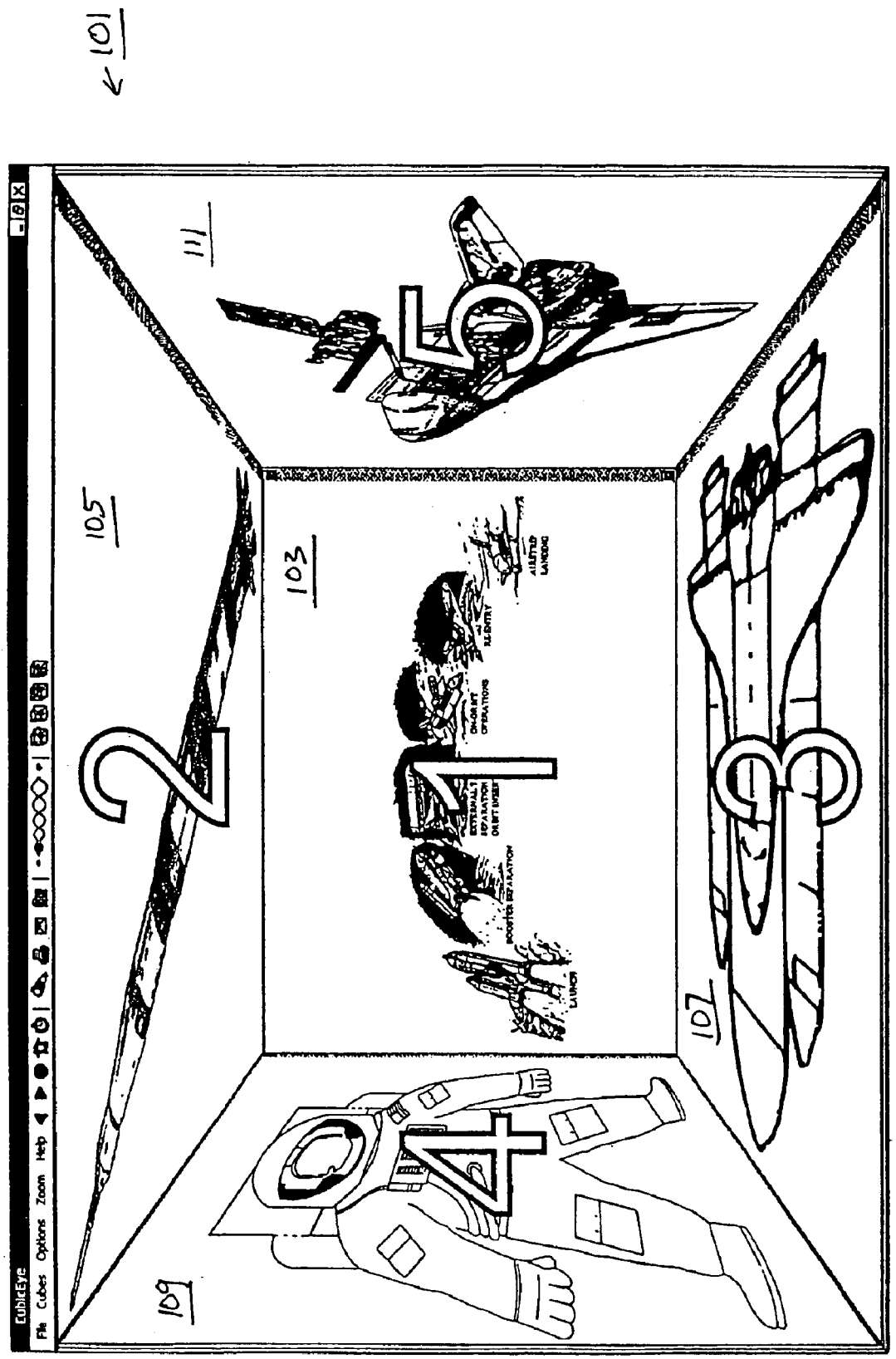
FIG. 1 is a view of a computer screen display in accordance with the invention disclosed in U.S. patent application Ser. No. 09/561,862.

FIG. 1 is a pictorial view of the output of a computer display device 101, such as a computer monitor, on which is displayed five Web pages 103, 105, 107, 109, and 111 simultaneously in a manner that simulates a three dimensional space in accordance with aforementioned U.S. patent application Ser. No. 09/561,862. That patent application discloses a method and apparatus for spatially organizing and interfacing to computer files, and particularly pages on the World Wide Web. A plurality of related Web pages are organized and presented for view on a computer screen in an apparent three or four dimensional relationship to each other. Referring to FIG. 1, in a basic embodiment, five pages are simultaneously displayed, comprising center 1, top 2, bottom 3, left 4, and right 5 faces forming five faces of a cube. The display gives the appearance of looking at the inside of a cube and viewing five of the faces thereof (with the sixth face being transparent or behind the user so that the user can see within the cube). Each face of the cube is filled with a Web page.

Figure 2:
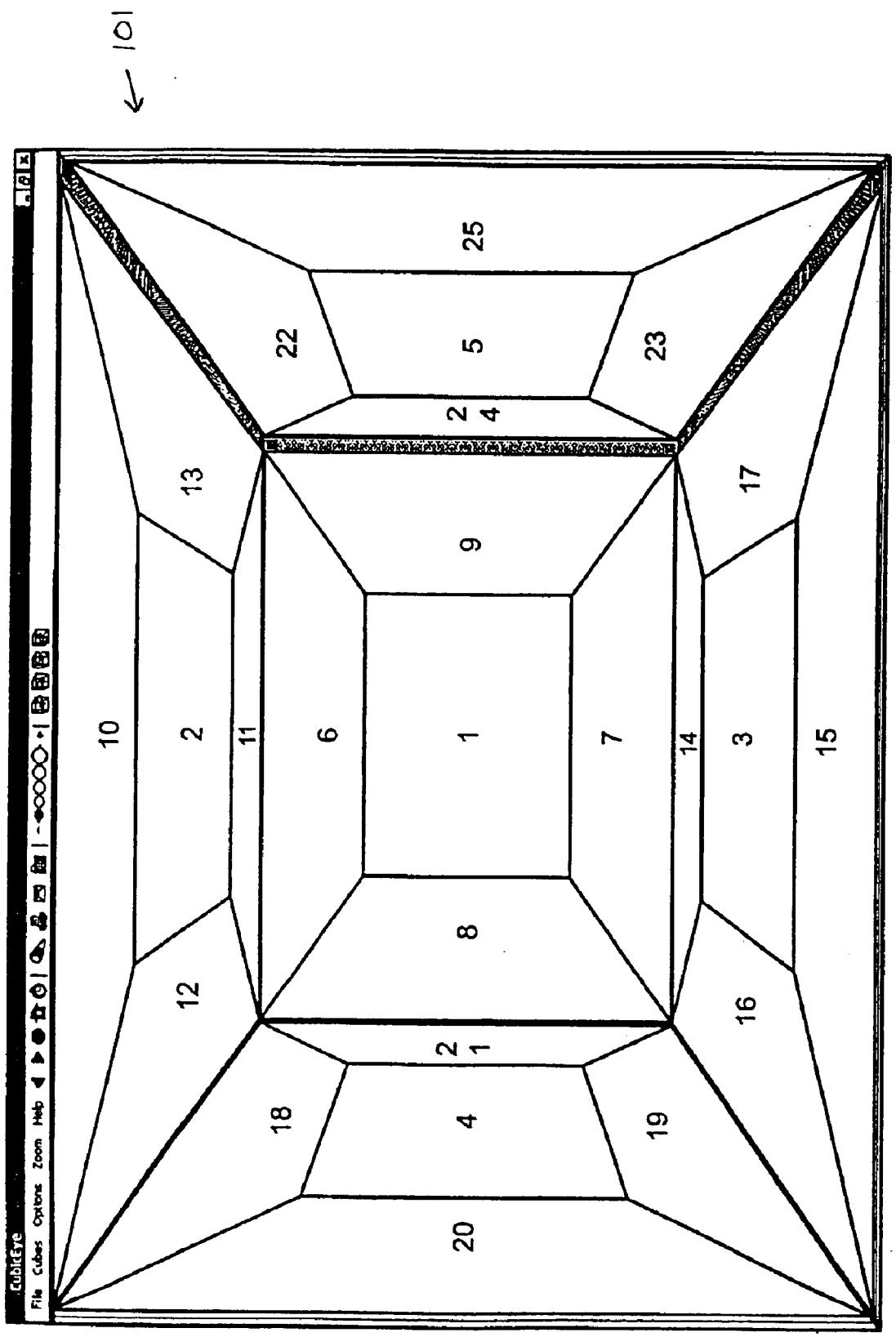
FIG. 2 is a view of another computer screen display in accordance with the present invention.
Figure 3:
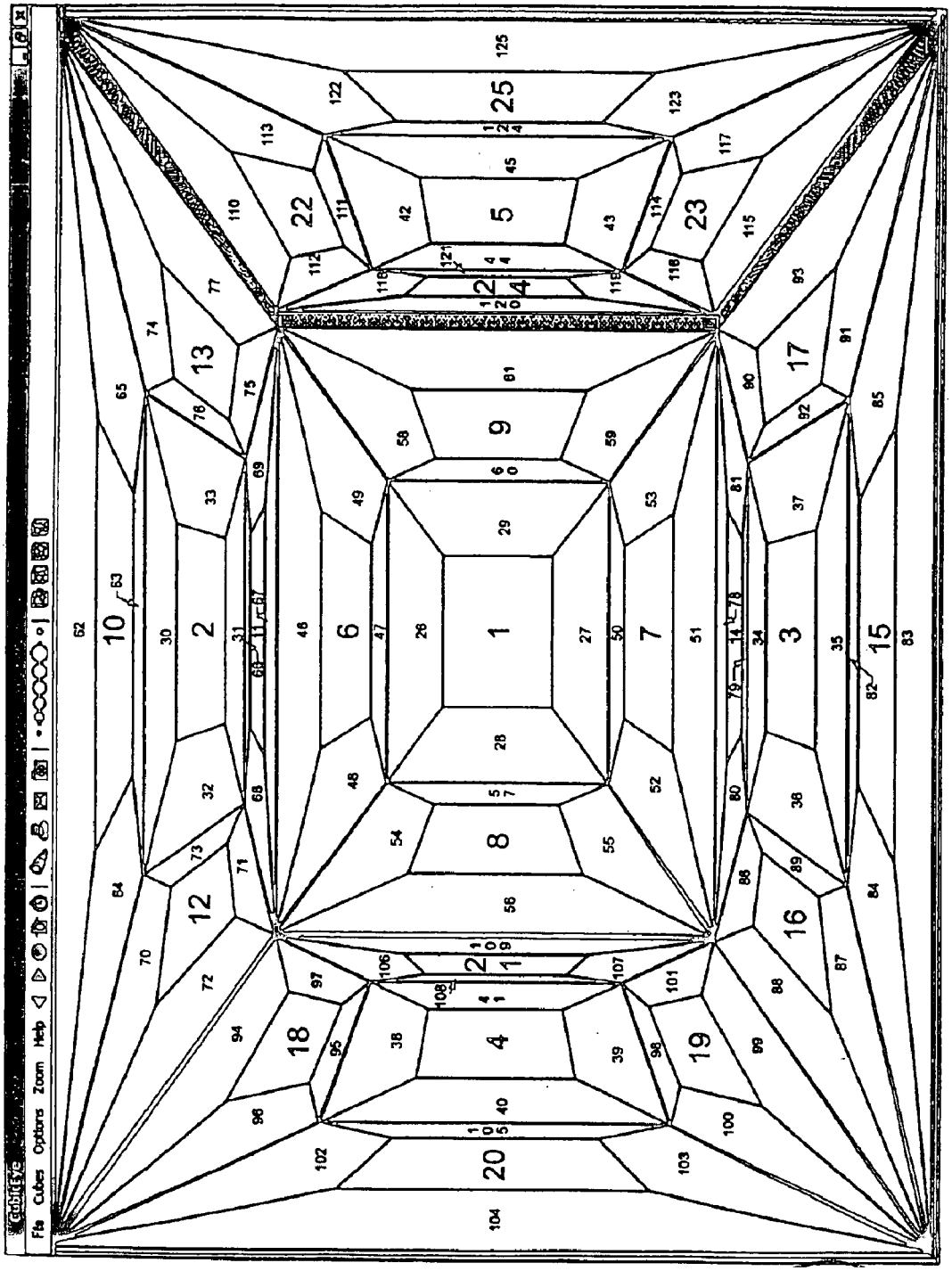
FIG. 3 is a view of another computer screen display in accordance with the present invention.

In other embodiments, more pages can be displayed by adding to the display the faces of additional cubes surrounding the first cube. As described in that application, more than five pages may be displayed simultaneously such as by displaying some of the "cubes" surrounding the cube shown in FIG. 1. For instance, FIG. 2 shows a screen display comprising twenty-five panels in which a center cube and each of four cubes surrounding it are seen, each having five viewable faces. Moving out a further level allows 125 faces/panels to be displayed simultaneously, as illustrated in FIG. 3.

The spatial organization of pages can be representative of a true three dimensional spatial relationship of pages to each other. For instance, where the pages are renderings (e.g., photographs) of actual or fictitious three dimensional space, they can be arranged within the framework of the cube faces in the relationship that they would have to each other in actual space. However, the invention is equally applicable to Web pages that do not actually represent physical spaces. In such cases, the arrangement of linked Web pages still can be organized and/or displayed in the same arrangement even though the spatial basis of the arrangement does not necessarily bear any relation to a true spatial arrangement of the information content of the pages. While such pages can be filled into the display format in a random fashion, preferably, they are arranged in some logical organization relative to the spatial framework provided by the present invention. In a preferred embodiment, Web site operators can specify the virtual spatial arrangement of the pages of their Web sites such as by using meta tags or other meta data embedded within the pages of the Web site. Alternately, or at least for those Web sites that do not provide their own spatial organization, the Web browser of the present invention may impose a virtual three or four dimensional spatial arrangement to the pages.

In one embodiment, a user navigates through the displayed pages by moving the screen pointer onto a particular one of the displayed pages. In response, the pages shift positions within the display framework so that the selected page moves to the center face of the display and all of the other pages move accordingly to maintain the same spatial relationship to each other. Thus, when a new page becomes the center page, (1) some of the pages previously displayed move to new panels, (2) some pages disappear from the display because their spatial relation to the other pages is such that the face to which they correspond is not a face that appears in one of the panels on the screen in accordance with the new orientation, and (3) some new pages appear because the face to which they correspond appears in a panel of the display in accordance with the new orientation, whereas they did not in the previous orientation. Depending on the number of non-displayed pages stored in memory, and the particular reorientation, the newly displayed pages may have already been in memory or may need to be loaded at the time of reorientation. Likewise, the pages that disappear from the display may be overwritten in memory or may remain.

In accordance with the aforementioned patent application, when one navigates through the virtual space comprised of the cubes and the Web pages that correspond to the faces of the cubes, the pages stay in the same virtual spatial relationship to each other. For instance, referring again to FIG. 1, if the user navigates through the space such that the page in the left panel 4 is moved to the center panel 1, then the page in the center panel moves to the right panel 5 and the page that was in the right panel moves to a position that is not seen in the display and thus disappears. However, if the user moves the page which is now in the center panel 1 back to the left panel 4, the page that had disappeared will return to the right panel 5.

In accordance with the aforementioned patent application, all of the simultaneously displayed pages are being displayed through the same Web browser and are interactively related, such as described in the navigation examples discussed above. In Web browsers that allow for the display of multiple Web pages simultaneously by means of simultaneously running several instances of the same Web browser, on the other hand, there is no interactivity among the multiple pages. Rather, there are simply two or more Web browsers running simultaneously, but entirely independently of each other.

While the spatial organization of the multiple, simultaneously displayed, pages provides a great many advantages, sometimes a user may wish a particular page to remain always displayed as he or she navigates through the World Wide Web. For instance, when visiting a retail Web site, it may be desirable for the shopping cart page to be always displayed. In order to describe the invention in a context in which it is likely to be particularly useful, let us consider an embodiment in which five pages are displayed simultaneously and that the five displayed Web pages are all from the same Web site, that Web site being a retail Web site in which users may purchase goods.

As previously discussed, the user's shopping cart page includes a list of items that the user has selected to purchase so that the user may keep track of the items selected as well as other information, such as a running total of the cost of the items selected for purchase thus far.

As anyone who has shopped online can probably attest, one frequently revisits the shopping cart page to be reminded of items selected and other information. Thus, it may be desirable to keep the shopping cart page always within view (hereinafter "always there") while the user navigates around the Web site finding the pages and goods of interest.

In accordance with the invention, the Web site operator may embed meta-data within a page of its site that indicates to the Web browser that the page is an "always there" page in accordance with the present invention. The Web site operator also may be given the option of designating (e.g., through meta data) which panel of a display the "always there" page should appear within. Thus, when an "always there" enabled Web browser in accordance with the present invention pulls up that page into a panel in the display, it will keep that page in the same panel thereafter until the user exits that Web site or otherwise de-designates that page as an "always there" page. For instance, the user may be given the option of turning off any page as an "always there" page, such as through a pop up menu when the right mouse button is clicked with the cursor in the particular panel.

In addition or in the alternative to allowing the Web site operator to designate "always there" pages using meta data, the user may be given the option of selecting the page in any one or more panels to be an "always there" page regardless of whether or not the page itself has been designated by the Web site operator as an "always there" page.

The user may select the page to be an "always there" page in any convenient manner. For instance, right clicking a mouse while the cursor is positioned in the corresponding panel may bring up a pop up menu in which one of the options is "Make always there". Alternately, the option may be presented as a button on a toolbar somewhere in the display. Even further, one of the mouse buttons or a keyboard key can be designated as a hot button for activating the "always there" feature.

Figure 4A:
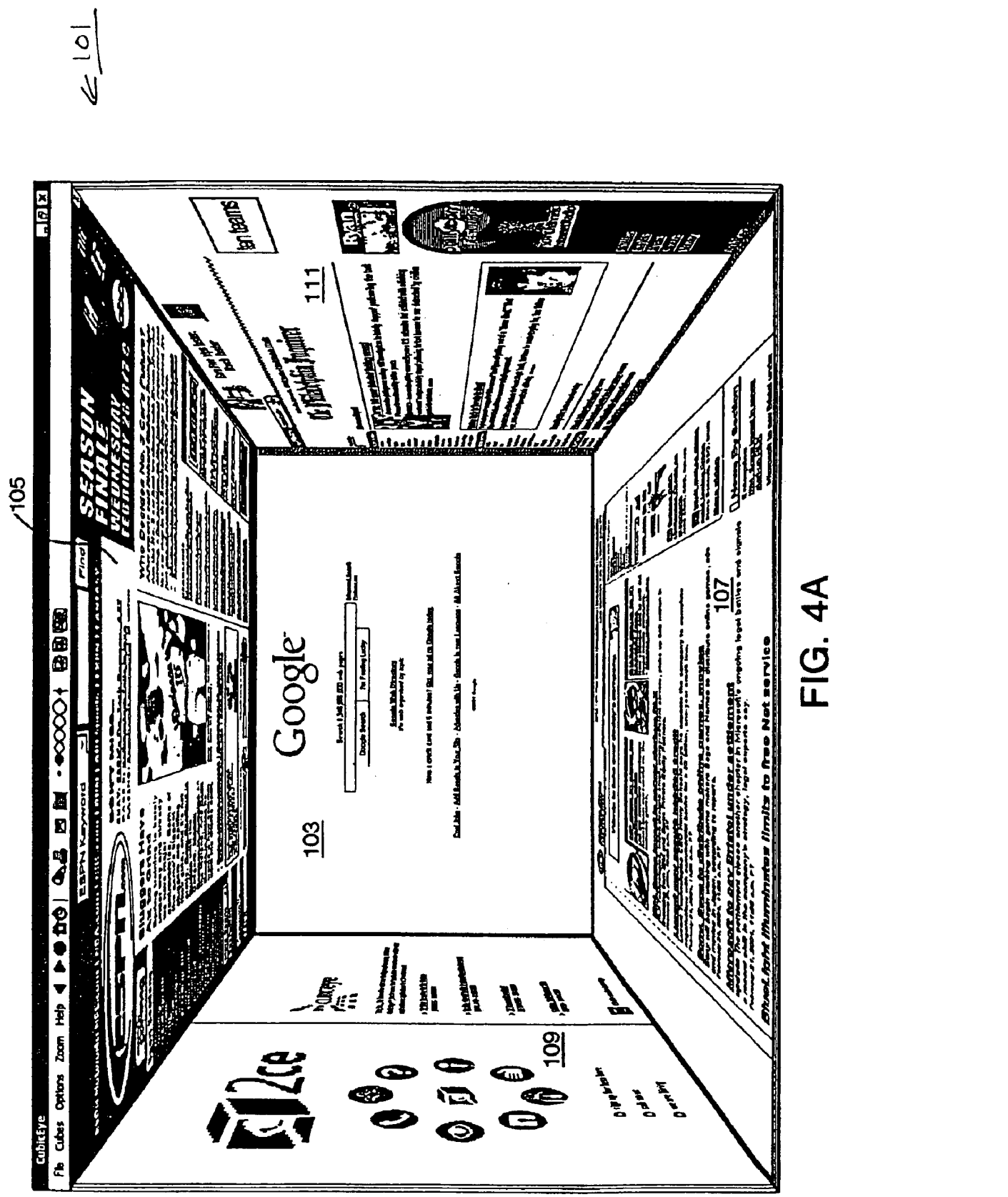
FIGS. 4A and 4B are two more views of computer screen displays in accordance with the present invention.
Figure 4B:
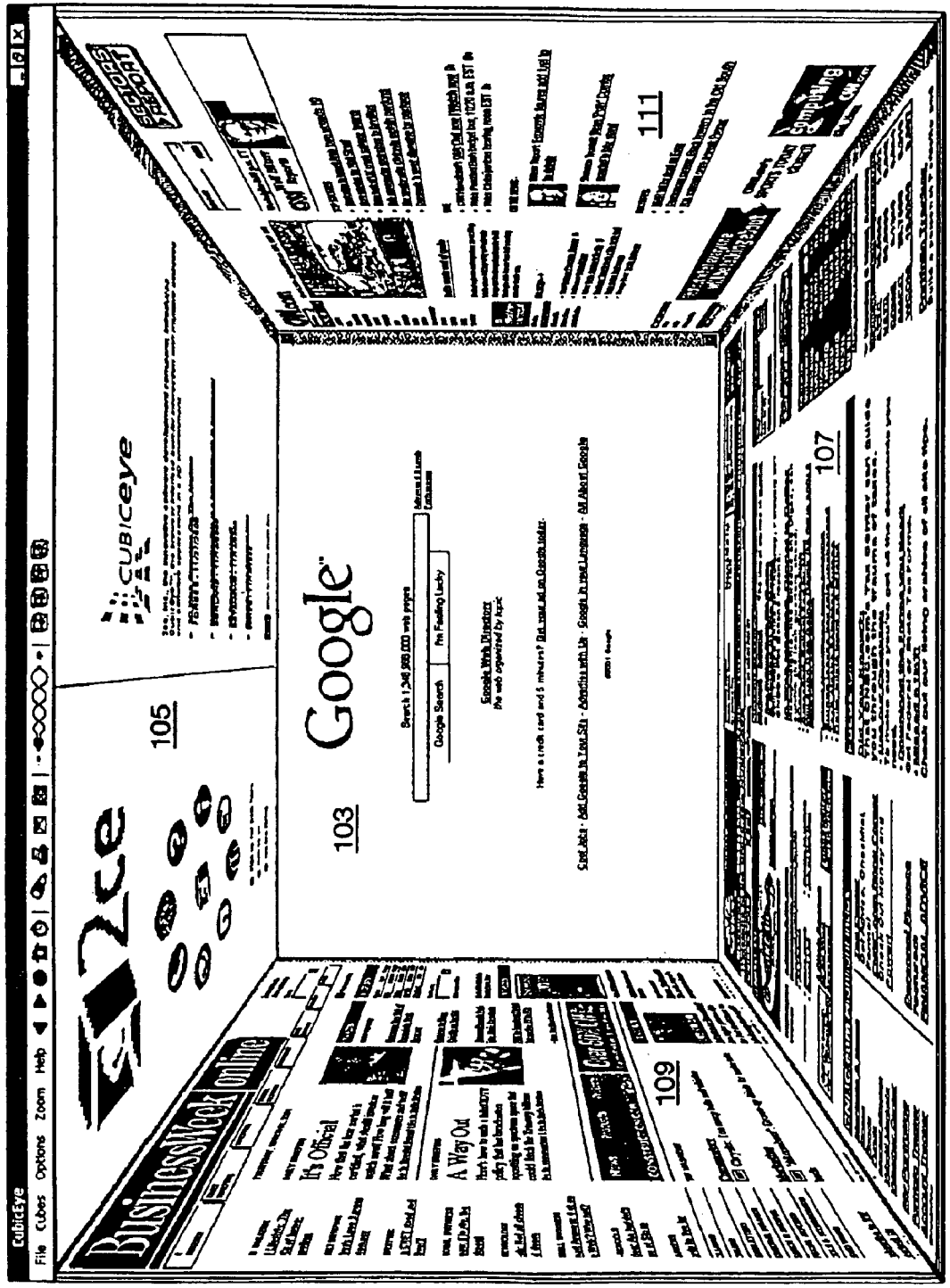

FIGS. 4A and 4B illustrate the present invention in a practical context other than a retail Web site having a shopping cart page. Particularly, a user may wish to have his home page or a search engine Web site's home page "always there" for easy access for purposes of ease in accessing multiple pages located in a search. As seen in FIG. 4A, a search page has been placed in the center panel of the display. The user may have navigated so as to place that page in the center panel or, alternately, the search Web site may have meta-data embedded in its pages that indicate to the Web browser that the search page should be placed in the center panel of the display. Surrounding the always there page are four other pages that the user may have placed there by selectively opening pages found by the search. Alternately, the browser software may have opened them automatically, such as by opening the first four pages found by the search or by opening four pages corresponding to the first page located by the search.

Let us assume that the user has designated the search page as an "always there" page and the other four displayed pages are from the Web site corresponding to the first page located in the search. If the user navigates through the site by moving the page displayed in the left panel to the top panel, the other pages displayed in the panels will change in order to maintain the assigned spatial arrangement. Thus, the display may change to that shown in FIG. 4B wherein the pages displayed in the top, bottom, left and right panels have all been replaced with other pages. However, the search page remains in the center panel. All of the panels have changed except for the center panel, which still displays the search page.

The page that should have appeared in a panel occupied by an "always there" page, but cannot because of the permanence of the "always there" page, can be handled in any reasonable fashion. In one embodiment, in order to maintain the virtual spatial relationship of all of the pages, it may be treated as being in that panel for purposes of navigation, but it is not shown, i.e., it is obscured by the "always there" page. Alternately, the Web browser may keep track of the original location of the "always there" page in the virtual space and exchange the page that normally would have appear in the panel occupied by the "always there" page with the original location of the "always there" page. Note, however, that this latter embodiment, will alter the virtual spatial relationship of the pages, which may be undesirable. Another option is to "skip" the panel occupied by the "always there" page as one navigates through the virtual space causing pages to shift between the various panels in the display. For instance, referring to FIG. 1, if a user navigates through the space so as to cause the page in the left panel 4 to move rightwards in the display one panel, instead of that page appearing in the center panel 1, it simply moves from the left panel 4 to the right panel 5. Again, this may alter the virtual spatial relationship of the pages to each other and, therefore, may be undesirable in certain cases.

In the context of a Web browser such as disclosed in the aforementioned patent application Ser. No. 09/561,862, in which one browser is displaying all of the pages and in which the pages are interactive, rather than separate instances of the same browser independently displaying pages, the "always there" feature is particularly useful. For instance, the Web browser can be designed to support dragging and dropping between two different panels. For instance, when a user wishes to purchase a good displayed on one page, he or she can add it to the shopping cart by dragging and dropping an image of the good into an appropriate field of the shopping cart page.

One could select any page as the "always there" page. For instance, a user may wish to keep a page "always there" that comprises a list of all of the products of a certain type that is of interest so that he or she can revisit that page as an easy point from which he or she can hyperlink to pages with more detail about each product so that he or she can compare them. Further, while the examples discussed above all pertain to a situation in which one page is designated the "always there" page, in some cases, it may be desirable for two or more pages to simultaneously be "always there" pages.

An "always there" page need not be in the center panel. In fact, it may be more practical for the "always there" page to be in one of the other panels, thus preserving the center panel, which is the most easily viewable panel, for general use during browsing. From an ergonomic and/or user friendliness perspective, the bottom panel may be the most preferable panel in which to keep "always there" pages. Specifically, humans are accustomed to thinking of the floor/ground as unchanging as they move through actual space (e.g., a building) while the walls and ceiling are more likely to reflect noticeable changes in environment. Accordingly, it may be most consistent with human intuition to use the bottom panel for the "always there" feature.

Having thus described a few particular embodiments of the invention, various alterations, modification, and improvements, will readily occur to those skilled in the art. For instance, the invention is not only useful in Web browsers, but can be applied in any software application that supports displaying multiple panels simultaneously. Such alterations, modifications, and improvements as are made obvious in this disclosure are intended to be part of this description though not expressly stated herein and are intended to be within the spirit and scope of the invention. Accordingly, the foregoing description is by way of example only, and not limiting.

What is claimed is:

1. A method of browsing the World Wide Web comprising the steps of:
   (1) relating Web pages on said World Wide Web to each other consistent with a spatial organization;
   (2) simultaneously displaying multiple Web pages in multiple panels of a display in a manner consistent with said spatial organization;
   (3) allowing a user surfing the World Wide Web to move a Web page between said panels of said display;
   (4) designating at least one of said Web pages as an always there page "responsive to data identifying said at least one Web page as an always there page, said data contained in said at least one Web page;"
   (5) responsive to a user moving a Web page between panels, automatically moving others of said Web pages among said panels, except said always there page and any page that, responsive to said movement would otherwise appear in said panel occupied by said always there page, in a manner that is consistent with said spatial organization; and
   (6) causing said always there Web page to remain in a particular panel of said display regardless of movement of other Web pages.

2. The method of claim 1 wherein step (6) comprises, responsive to movement by said user of a page displayed in one of said panels to another panel, moving said pages displayed in other of said panels correspondingly, except for said always there page.

3. The method of claim 1 wherein step (4) is performed by said user.

4. The method of claim 1 wherein step (4) is performed automatically responsive to meta-data contained in said at least one Web page.

5. The method of claim 4 wherein said meta-data is embedded within said at least one Web page.

6. The method of claim 1 wherein step (2) comprises displaying said multiple Web pages in a manner that emulates at least three dimensional space.

7. The method of claim 6 wherein said spatial organization of Web pages corresponds to at least a three dimensional spatial interrelationship.

8. The method of claim 1 wherein, in step (5), said page that would otherwise appear in a panel within which said always there page is displayed, is not displayed.

9. A computer implemented method of organizing and displaying data on a computer display, said data comprised of separate computer files comprising data for display, said method comprising the steps of:
   (1) relating said files to each other consistent with a spatial organization;
   (2) simultaneously displaying multiple files in multiple panels of a display in a manner visually consistent with said spatial organization;
   (3) allowing a user to move said files among said panels of said display;
   (4) designating at least one of said files as an always there file responsive to data identifying said at least one of said files as an always there file, said data contained in at least one of said files;
   (5) responsive to a user moving a file between panels, automatically moving other of said files among said panels, except said always there file and any page that, responsive to said movement would otherwise appear in said panel occupied by said always there page, in a manner that is consistent with said spatial organization; and
   (6) causing said always there file to remain in a particular panel of said display regardless of movement of other Web pages.

10. The method of claim 9 wherein step (6) comprises, responsive to movement by said user of a file displayed in one of said panels to another panel, moving said files displayed in others of said panels correspondingly, except for said always there file.

11. The method of claim 9 wherein step (4) is performed by said user.

12. The method of claim 9 wherein said data contained in at least one of said files is contained within said designated always there file.

13. The method of claim 9 wherein step (2) comprises displaying said multiple files in a manner that emulates at least three dimensional space.

14. The method of claim 13 wherein said spatial organization of files corresponds to at least a three dimensional spatial interrelationship.

15. The method of claim 9 wherein, in step (5), a file that would otherwise appear in a panel within which said always there file is displayed, is not displayed.

16. A computer implemented Web browser comprising:
   a first program for relating Web pages on said World Wide Web to each other consistent with a spatial organization;
   a second program for simultaneously displaying multiple Web pages in multiple panels of a display in a manner visually consistent with said spatial organization;
   a third program for allowing a user to move a Web page among said panels of said display;
   a fourth program for designating at least one of said Web pages as an always there page responsive to data identifying said at least one of said Web pages as an always there page, said data contained in said at least one Web page;
   a fifth program, responsive to a user moving a Web page among panels, for automatically moving others of said Web pages among said panels, except said always there page and any page that, responsive to said movement would otherwise appear in said panel occupied by said always there page, in a manner that is consistent with said spatial organization; and
   a sixth program for causing said always there Web page to remain in a particular panel of said display regardless of movement of other Web pages.

17. The Web browser of claim 16 wherein said sixth program is responsive to movement by said user of a page displayed in one of said panels to another panel to move said pages displayed in other of said panels correspondingly, except for said always there page.

18. The Web browser of claim 16 wherein said fourth program is responsive to a user of said Web browser.

19. The Web browser of claim 16 wherein said fourth program is responsive to meta-data contained in said at least one Web page.

20. The Web browser of claim 19 wherein said fourth program is responsive to meta-data embedded within said at least one Web page.

21. The Web browser of claim 16 wherein said second program displays said multiple Web pages in a manner that emulates at least three dimensional space.

22. The Web browser of claim 21 wherein said spatial organization of Web pages corresponds to at least a three dimensional spatial interrelationship.

23. The Web browser of claim 16 wherein said fifth program causes said page that would otherwise appear in a panel within which said always there page is displayed, to not be displayed.

24. A method of browsing the World Wide Web comprising the steps of:
   (1) relating Web pages on said World Wide Web to each other consistent with a spatial organization;
   (2) simultaneously displaying multiple Web pages in multiple panels of a display in a manner consistent with said spatial organization;
   (3) allowing a user surfing the World Wide Web to move a Web page between said panels of said display;
   (4) designating at least one of said Web pages as an always there page;
   (5) responsive to a user moving a Web page between panels, automatically moving others of said Web pages among said panels, except said always there page and any page that, responsive to said movement would otherwise appear in said panel occupied by said always there page, in a manner that is consistent with said spatial organization; and
   (6) causing said always there Web page to remain in a particular panel of said display regardless of movement of other Web pages;
   wherein step 4 comprises the steps of;
      (4.1) said user positioning a cursor in one of said panels corresponding to said at least one Web page;
      (4.2) said user right clicking on a mouse;
      (4.3) responsive to performance of step (4.2), causing a menu to be displayed, said menu including an option to designate said at least one Web page as an always there page; and
      (4.4) responsive to said user selecting said option from said menu, causing said at least one Web page to be designated as said always there page responsive to said selection.

25. A computer implemented method of organizing and displaying data on a computer display, said data comprised of separate computer files comprising data for display, said method comprising the steps of:
   (1) relating said files to each other consistent with a spatial organization;
   (2) simultaneously displaying multiple files in multiple panels of a display in a manner visually consistent with said spatial organization;
   (3) allowing a user to move said files among said panels of said display;
   (4) designating at least one of said files as an always there file responsive to data contained in at least one of said files;
   (5) responsive to a user moving a file between panels, automatically moving other of said files among said panels, except said always there file and any page that, responsive to said movement would otherwise appear in said panel occupied by said always there page, in a manner that is consistent with said spatial organization; and
   (6) causing said always there file to remain in a particular panel of said display regardless of movement of other Web pages,
   wherein step (4) comprises the steps of:
   (4.1) said user positioning a cursor in one of said panels;
   (4.2) said user performing an operation indicating a desire that said at least one file be designated as an always there file;
   (4.3) said user right clicking on a mouse;
   (4.4) responsive to performance of step (4.3), causing a menu to be displayed, said menu including an option to designate said at least one file as an always there file; and
   (4.5) responsive to said user selecting said option from said menu, causing said file displayed within said panel within which said cursor was positioned in step (4.1) to be designated as said always there file.

26. A computer implemented Web browser comprising:

a first program for relating Web pages on said World Wide Web to each other consistent with a spatial organization;

a second program for simultaneously displaying multiple Web pages in multiple panels of a display in a manner visually consistent with said spatial organization;

a third program for allowing a user to move a Web page among said panels of said display;

a fourth program for designating at least one of said Web pages as an always there page;

a fifth program, responsive to a user moving a Web page among panels, for automatically moving others of said Web pages among said panels, except said always there page and any page that, responsive to said movement would otherwise appear in said panel occupied by said always there page, in a manner that is consistent with said spatial organization; and a sixth program for causing said always there Web page to remain in a particular panel of said display regardless of movement of other Web pages;

wherein said fourth program operates, responsive to said user positioning a cursor in one of said panels corresponding to said at least one Web page and right clicking on a mouse, to cause a menu to be displayed, said menu including an option to designate said at least one Web page as an always there page, and, responsive to said user selecting said option from said menu, designating said at least one Web page as an always there page.

* * * * *